Dec. 13, 1966     W. W. STEINMAN     3,291,056
ELECTRIC MOTOR PUMP

Filed April 22, 1965     3 Sheets-Sheet 1

INVENTOR.
WILLIAM W. STEINMAN
BY
Edward J. Utz
ATTORNEY

Dec. 13, 1966  W. W. STEINMAN  3,291,056
ELECTRIC MOTOR PUMP

Filed April 22, 1965  3 Sheets-Sheet 2

INVENTOR.
WILLIAM W. STEINMAN
BY
Edward J. Utz
ATTORNEY

INVENTOR.
WILLIAM W. STEINMAN
BY
ATTORNEY

United States Patent Office 3,291,056
Patented Dec. 13, 1966

3,291,056
ELECTRIC MOTOR PUMP
William W. Steinman, 2621 Fleetwood Ave.,
Cincinnati, Ohio
Filed Apr. 22, 1965, Ser. No. 450,100
3 Claims. (Cl. 103—87)

This invention relates in general to dynamoelectric mechanisms and in particular relates to an electric motor associated with a centrifugal pump.

Prior to my invention electric motors essentially comprised a stator member and a rotor member with an annular magnetic air gap separating these members. The purpose of this air gap was to provide electrical insulation and at the same time to permit freedom of movement of these inductively associated members. It was necessary to provide means of support for the rotating member, usually accomplished with the use of a rotor shaft having bearing supports. Also, means of establishing and maintaining an essentially uniform magnetic air gap dielectric, was commonly accomplished through the use of the same rotor shaft and bearings.

In my invention I show a novel device whereby the necessity for providing an annular magnetic air gap and/or shaft bearings is eliminated. This new device permits changes in dynamoelectric mechanisms heretofore found impractical because of the mechanical and physical limitations necessary to provide the annular air gap dielectric and the rotating member shaft support bearings. Consequently, with my invention, space requirements and manufacturing costs are substantially reduced and design requirements are simplified. As a result, the versatility of applications are increased.

Heretofore the conventional centrifugal pump design required some means of sealing the flowing liquids within the pump housing while at the same time permitting rotational movement of the pump impeller drive shaft. This was commonly achieved through the use of pump shaft sleeves sealed with packing rings that were contained within a stuffing box. An alternate method used mating seal faces comprising a rotary member attached to the pump shaft and the mating stationary member attached to the pump housing where the shaft enters the housing. This invention eliminates all need for pump shaft seals of any type, thereby eliminating the chief cause of operational maintenance expense as well as eliminating the need for providing seal lubrication.

Prior to the practice of this invention, the fire, explosion or personal injury hazard that was inherent with the potential leakage caused by any packing or seal failure prohibited the use of most conventional centrifugal pumps. Since the practice of this invention eliminates all types packings and seals, thereby eliminating all possibility of leakage at these areas, it is now possible to use my efficient centrifugal pumps for transporting those liquids which formerly created hazards when leaking at the packing or seal surfaces.

The pump generally described in this invention is of the rotary-centrifugal type. This invention is equally applicable to pumps of the axial flow, propeller, eccentric cam types and also to combinations thereof. The novel features of this invention facilitate designing pumps to meet highly specialized pumping application requirements; especially where space or weight limits require a compact and efficient pump.

Without reducing or restricting its function and with increased overall efficiency, all or most of the following components are eliminated in motor pumps utilizing this invention: motor shaft ball bearings and bearings cartridge holders, motor shaft ball bearings, grease seals and Alemite pressure fittings, motor end bell housings, coupling connector for motor shaft to pump shaft, pump shaft support bearings, bearing housings, seals, means of seals lubrication, pump shaft packing glands, pump shaft sleeves and stuffing boxes, pump shaft packing rings, pump shaft packing means of lubrication, lantern ring, piping, pump suction end housing wear ring, pump discharge end housing wear ring, pump impeller wear rings.

Contrasted with a standard commercially available motor driver pump of equivalent horsepower, pressure head and volume, a pump using this invention would:
(a) Occupy only thirty (30%) percent as much space
(b), weigh only seventy-five (75%) percent as much (c), cost only sixty (60%) percent as much to manufacture (d) require substantially less maintenance, and (e), operate at greater electrical and mechanical efficiency, and with less power consumption.

This invention makes no claims in conflict with magnetic bearings, gas bearings, or fluid bearings of either the pressurized or hydrodynamic design, these bearings being severely limited on degree of permissible radial loading and will fail in service if bearing surfaces directly contact each other when rotating.

I have found that use of dissimilar ceramics, that is oxides of different metals provides better bearing conditions than when the same ceramic is used for both surfaces. The motor of my invention, having bearings designed for proper clearance after normal operating temperature rise, will operate for substantially longer periods without applied lubrication.

The metallic oxide surfaces are integral with their substrates which means that the substrate adhesion of the metallic oxide mass is substantially equal to or greater than the particle to particle cohesion within the mass. Furthermore, the particle to particle cohesion is sufficient to provide a rigid structure that is self-supporting. Furthermore, the particle to particle cohesion is sufficient to permit grinding and/or polishing the surface of the mass without picking out particles of the metallic oxides. Finished surfaces having an R.M.S. equivalent of four or better are obtained.

There are numerous methods of providing ceramic coatings on metal substrates. Among the more common ones are powder flame spraying, sputtering, plasma coating, solid ceramic rod spraying both by fuel and/or plasma gasses, porcelainizing, chemical oxidation, plating, and thermal decomposition. All can be used in practice of this invention.

My preferred method uses plasma melted powders applied according to industry accepted practices. With this method extremely fine powders of metallic oxides are melted and while molten are impinged upon the substrate at high velocity. A shielding envelope of the inert plasma gas surrounds both coating and substrate during deposit. I have found particle size to be a critical factor in the production of dense and strongly cohesive deposits. Optimum cohesion being obtained with particles ranging in the minus 200 plus 325 mesh sizes.

The principal object of my invention is to provide an electric motor stator/rotor bearing system which combines excellent load bearing and high starting torque characteristics with only moderately low frictional loss compared with gas, liquid, or magnetic bearing systems. As the ambient temperature of motor system rises, the value of my bearing system also increases.

Another object is to provide an electric motor having a functional bearing at temperatures where conventionally applied lubrication is impossible and where liquid bearings decompose and gas bearings become unstable. The coefficient of friction between several of my metallic oxide bearings such as boron nitride, zirconium silicate and chromium oxide, decreases as the temperature rises. Laboratory tests and experiments indicate that boron nitride and, to a lesser extent, both zirconium silicate and chromium oxide, posses inherent lubricity qualities, the exact nature of which has not yet been determined. All my metallic oxide bearing surfaces benefit from a substantially lower coefficient of friction when a glaze or patina is formed during the initial operating period.

Another object of my invention is the use of a dry film lubricant such as molybdenum di-sulphite will materially assist in establishing this patina which permits later operation without additional lubrication being required. The duration of the non-lubricated operation has ranged from several minutes to several days.

Another object of my invention is to provide improved bearings which operate at high temperatures without lubrication. Another object of my invention is the use of a dynamoelectric machine having inductively associated members which are capable of movement in bearing/journal relation without magnetic air gap separation between the two of them. Another object of my invention is to provide improved coil winding insulation at high temperatures. Another object of my invention is to provide an electric motor driven pump without pump shaft packing, or rotating member seals. Other objects of my invention are the provision of an electric motor driven pump having greater capacity per unit volume space, more compact and more efficient, and means for utilizing liquids being pumped to also cool the motor and bearings and to lubricate the bearings, and means for combining the pump housing so as to function also as an impeller thrust bearing means. Still another object of my invention is to provide a method of combining the thrust plate so as to function also as a part of the pump housing, and to provide for compensation for wear of thrust bearings and thrust journals. Still another object of my invention is to provide the combination of impeller shroud walls to function as dual directional thrust journals. And still another object of my invention is the provision of a motor housing which functions also as a pump suction orifice and means for rapid disassembly and reassembly of the pump and motor for cleaning purposes. Other objects and details of construction will definitely appear from the detailed descriptions to follow.

In general, my invention comprises a dynamo-electric pumping mechanism using a wound stator member which substantially envelops a rotor member. This rotor member is inductively associated with the stator member, but without magnetic air gap separation. The stator has an arcuate inner surface which is composed of a plurality of cylindrical segments, which are separated axially by grooves. The segments and grooves are located annularly along the inner circumference of the stator laiminations. The segments have an inner arcuate surface comprising an integral dielectric metallic oxide which provides bearing means. A hollow rotor having an outer cylindrical surface which is composed of an integral dielectric metallic oxide providing journal means is associated with said stator bearing means. I provide a hollow cylindrical tube secured to said rotor. This tube extends axially having one extremity substantially defining the inner circumference of the pump impeller. A plurality of ducts are located on the inner cylindrical surface of said tube near the suction end. These ducts extend radially on planes perpendicular to the vertical axis, and also extend axially along planes inclined 85 degrees from the horizontal toward the discharge end. These ducts which extend through the above described tube also extend through the rotor journal surface and terminate as orifices. These orifices connect in rotative sequence with each of a plurality of axial interface channels. These channels are defined by the stator voids with the stator rotor journal bearing surface. I also provide a cylindrical thrust plate of essentially rectangular cross section which has a planar surface defining a co-planar surface on the abutting impeller shroud surface. This plate further has a plurality of ducts originating as orifices located co-axially with the innerface channels. These ducts are inclined approximately 60 degrees from the horizontal axis and terminate as orifices defining a circle substantially greater than the outer cylindrical surface of the impeller vanes. The thrust plate has a plurality of holes co-axial with abutting holes in both pump housing and also motor housing for purposes of securing. I provide a pump impeller which consists of a plurality of vanes extending radially and lying between co-planar shrouds having surfaces which abut both the thrust plate and the pump housing. In addition, my invention provides a pump housing in combination with the thrust plate. This pump housing has a radial discharge orifice and I also provide a motor housing which consists of a cylindrical shell enveloping the stator member and having an orifice co-axial with the rotor tube extremity to provide a suction inlet.

In the drawings.

In the drawings the same reference numerals apply throughout the several views and the sectional views are taken looking in the direction of the arrows at the ends of the section lines.

Figure 1:
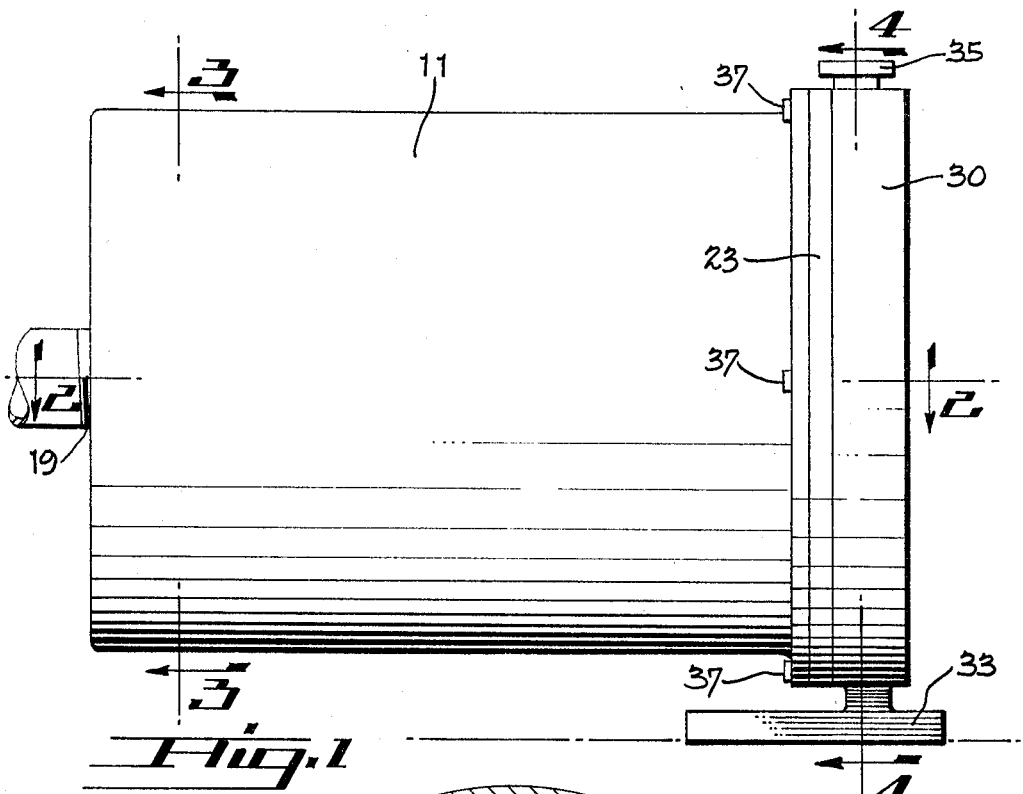
FIGURE 1 is a view of my electric motor pump.

In the drawings I show a motor housing 11 which envelops and supports the stator laminations 26, and partly provides a means of containing liquids pumped into prescribed channels. An orifice provides entry for input power cables 13; a keyway and locking key 36 secures the laminated stator segments 26. An epoxy resin such as 12 provides insulation for the conductors 13 comprising the stator field coil windings exposed end laps. A plurality of silicon steel punchings 44 are laminated together to form the stator 10. Voids that were notched in each segment are aligned to provide stator slot channels 40. The side and bottom walls of the slot channels 40 are insulated with ceramic 20 prior to the installation of the field coil windings 13. After installation, the top surfaces of the coil windings 13 are also insulated with ceramic layers 37, terminating substantially below the inside circumference so a channel is provided for lubrication. This also serves to lock the coils in the slots. The slot channel coil winding provides a rotating magnetomotive field from three phase alternating current supply. Low friction metallic oxide dielectric ceramics 14 provide plural arcuate bearing surfaces, lying between adjacent slot channels, for the full length of the stator assembly.

The laminated rotor segments 25 are formed from circular punchings of silicon steel 45. A plurality of voids are notched in each segment. When these voids are aligned during assembly on the rotor suction drive tube 22 they form longitudinal ducts 42, the segments being locked by key 41. Molten aluminum is then cast into these ducts forming both rotor current conductors 21 and shorting end rings 17. A low friction metallic oxide dielectric ceramic 16 provides the journal bearing surface on the outer circumference of the laminated segments and end rings. This surface conforms identically with the inside circumference of a circle described by the arcs of the segments of the stator bearing. For most efficient operation, the amount of running clearance between these two surfaces must be held to a minimum. A total diametral clearance of only .0002″ per inch of diameter is practical with low viscosity liquids.

Figure 3:
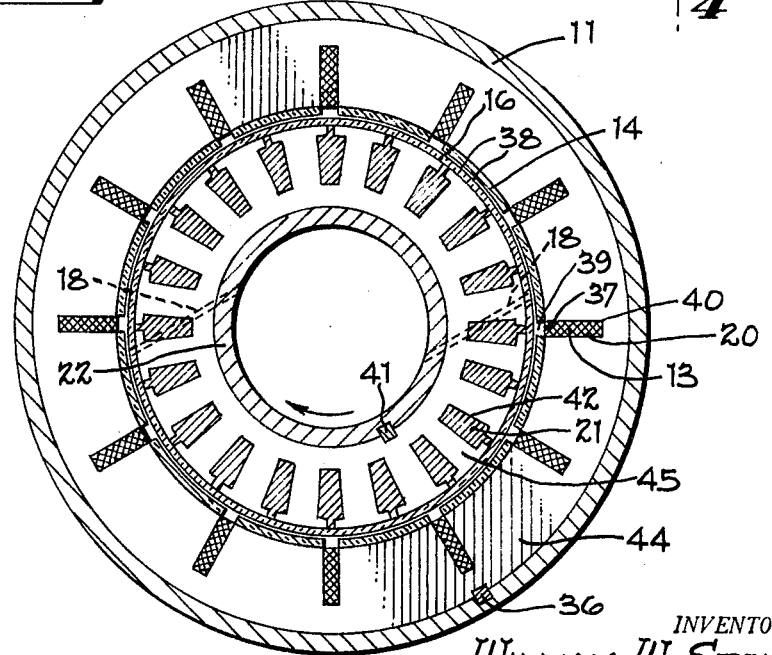
FIGURE 3 is a detailed, sectional view taken along the line 3—3 of FIGURE 1.
Figure 7:
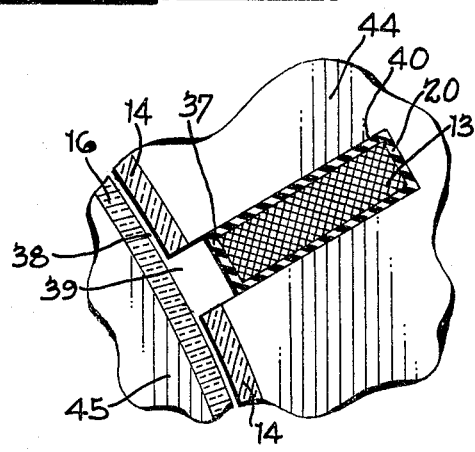
FIGURE 7 is a detailed sectional view of the windings and the insulation.

A plurality of holes 18 function as ducts connecting the rotor/stator interface with the interior of the suction drive tube 22. These holes or ducts originate as orifices 18 on the inside end. The ducts are axially oriented along planes inclined approximately 85 degrees toward the discharge end. The ducts are radially oriented along planes inclined approximately 45 degrees from the vertical axis with each duct orifice originating at a point substantially removed from the central axis. Thereby a rotational friction effect urges liquids into and through the ducts when the suction drive tube rotates in the designed direction as shown in FIGURE 3. Liquids are discharged at the rotor/stator bearings interface 38 continuously during normal rotative motion of the suction drive tube. At the bearings interface are a plurality of longitudinal channels 39. These channels are formed by the two side walls B–B of each stator slot channel 40, the insulated top surface A of the field coil winding 37, and the outside circumference C of the rotor journal 16 (see FIGURE 7).

As the pump suction tube rotates each of these longitudinal channels 39 is connected in rotative sequence with the rotor supply ducts' interface orifices and thereby through these supply ducts 18 with the liquids flowing inside the suction drive tube 22. In this manner a portion of the liquids being pumped is utilized to provide liquids for cooling the bearings interface, the stator and the rotor. After cooling these members the liquids are exhausted through thrust plate coolants discharge ducts 24 into the pump main discharge stream 34.

The proportion of liquids diverted for cooling purpose is determined by size of orifices and the radial angle inclination. When the direction of impeller rotation is reversed and when the radial angle orientation is reversed, the flow of coolant liquids will be in the opposite direction. A portion of the liquids being pumped will then be fed back through thrust plate ducts, through stator interface channels, through rotor suction tube ducts and into the main suction flow. A portion of the motor housing 11 provides the pump suction end plate having an intake orifice 19 which is directly connectable with the pump's associated supply piping. The inner circumference of the impeller front shroud 32 orifice and the outer circumference of the suction drive tube are threaded to provide means of fastening impeller to drive tube. A plurality of internal vanes 43 radiate from the impeller central axis in an essentially volute configuration. In operation they impel the liquids into the casing discharge channel 34 with a combined rotational and centrifugal motion. The pump housing 30 envelops the impeller and also limits axial movement of both rotor and of impeller thereby providing thrust bearing means. A discharge orifice 35 can be directly connected with the associated discharge piping. Together with the thrust plate 23 and the outer circumference of the impeller, the pump housing provides a casing discharge channel 34. The radial configuration of this casing discharge channel is essentially evolute with the channel cross section area becoming progressively greater toward the discharge orifice. A plurality of fasteners 37 provides means to quickly assemble and disassemble pump housing 30, thrust plate 23, and motor housing 11. The mounting foot 33 provides means of mounting support for the assembled motor pump.

The thrust plate 23 provides thrust bearing means for limiting axial movement of rotor and of the impeller and also forms part of the enclosure providing the pump housing discharge channel 34. A plurality of shim gaskets 28 and 29 of varying thickness are installed between motor housing 11 and thrust plate 23 and also between pump housing 30 and thrust plate 23. These provide means of preventing leakage of the liquids and of also accurately determining the axial position of the impeller.

During normal pumping operation fractional wear will cause metal to be abraded from the abutting surfaces of impeller front shroud 32 and thrust plate 23; also from the impeller back shroud 31 and the abutting pump housing 30, causing thereby a substantial loss in pump efficiency. The removal or exchange of shims such as 29 with addition of shims such as 28, said shims thickness corresponding to the amount of wear, will restore the pump efficiency, by reducing clearances of the abutting surfaces without changing the axial location of the impeller.

Figure 2:
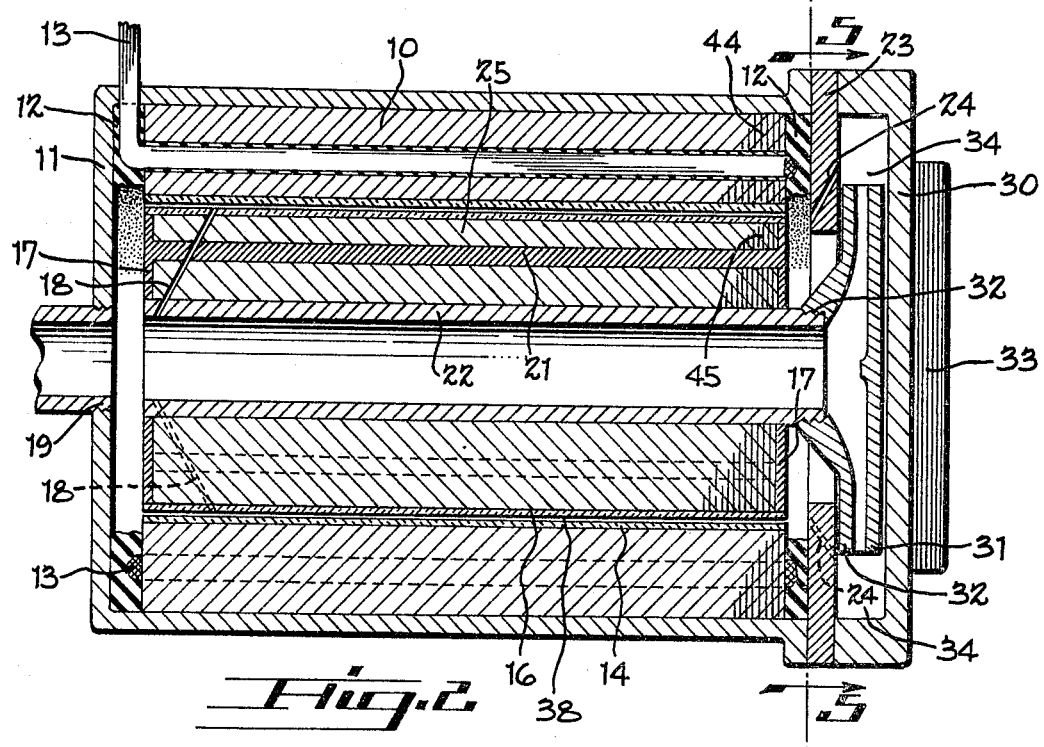
FIGURE 2 is a detailed sectional view taken along the line 2—2 of FIGURE 1.
Figure 5:
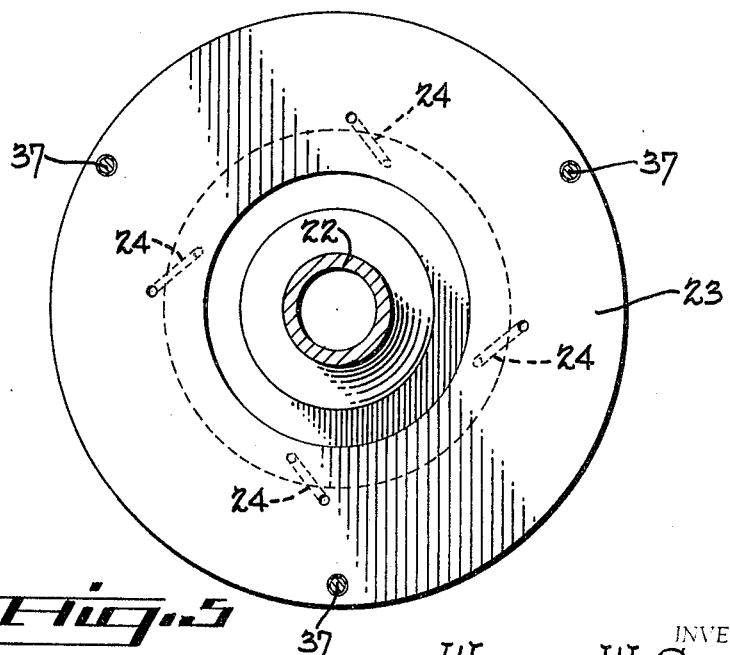
FIGURE 5 is a sectional view taken along the line 5—5 of FIGURE 1.
Figure 4:
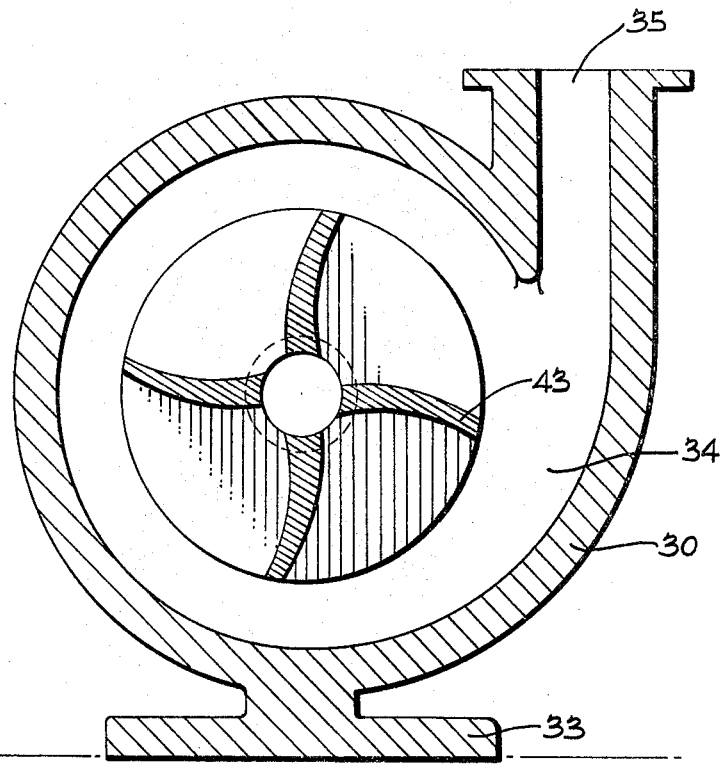
FIGURE 4 is a detailed, sectional view taken along the line 4—4 of FIGURE 1.
Figure 6:
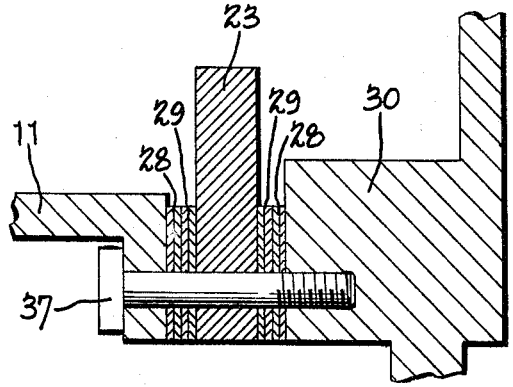
FIGURE 6 is a detailed, sectional view of a portion of the pump housing.

A plurality of holes 24 through the cross section of the thrust plate 23 form ducts providing means of flow for the coolant liquids between the stator coolant channels 39 and the pump discharge channel 34. These ducts originate at points substantially near the stator-rotor bearing interface; are inclined axially along a horizontal plane angle of approximately 60 degrees, and terminate in the discharge channel at points substantially near the impeller front shroud outer circumference. The ducts are oriented radially along planes inclined on angles substantially less than 90 degrees to the vertical face and with the ducts points of origin substantially nearer to the central axis than their points terminating in the pump discharge channel. The reason for this ductal orientation is to take advantage of the siphoning action of the liquids in the main discharge channel, which liquids are flowing at high speeds in a combined rotational and centrifugal movement. Thereby the flow of the liquids in the pump discharge channel facilitates the flow of the coolant liquids (see FIGURES 2 and 3).

Having thus described my invention, what I claim is new and useful and desire to secure by U.S. Letters Patent is:

1. In a dielectric pumping mechanism, the combination of an electrically wound stator member substantially involving a rotor member inductively associated therewith, but without magnetic air gap separation therebetween, the combination of a stator, a hollow rotor, said stator having an inner surface comprising a plurality of cylindrical segments separated axially by grooves, said hollow rotor having an outer cylindrical surface with dielectric metallic oxide covering said surface to provide journal means operationally associated with said segments on said stator, a hollow tube secured to said rotor and extending axially therefrom and having its extremity substantially defining the inner circumferences of a pump impeller rear shroud, a plurality of ducts located on the inner surface of said tube substantially near the suction end with said ducts extending radially on planes perpendicular to the vertical axis and through the hollow tube and through the rotor journal surface.

2. In a dynamoelectric pumping mechanism, having a magnetically wound stator member substantially enveloping a rotor member inductively associated therewith, but without magnetic air gap separation therebetween the combination of a stator having an arcuate inner surface configuration comprising a plurality of cylindrical segments separated axially by grooves, said segments being substantially those defined in the stator laminations and located annularly along the inner circumference of said laminations, said segments having an inner arcuate surface of integral dielectric metallic oxide providing bearing means; a hollow rotor having an outer cylindrical surface comprising an integral dielectric metallic oxide providing journal means operationally associated with said stator bearing means, concentric with said stator bearing; a hollow cylindrical tube enveloped by and secured to said rotor, said tube extending axially, having its extremity substantially defining the inner circumference of the pump impeller rear shroud, a plurality of ducts originating as annular orifices located on the inner cylindrical surface of said tube substantially near the suction end with said ducts extending radially on planes perpendicular to the vertical axis and also extending axially along planes inclined 85 degrees from the horizontal axis toward the discharge end, said ducts extending through the above named tube and through the rotor journal surface terminating as orifices located annularly thereon, said orifices being operationally associated in rotative sequence with each of a plurality of axial interface channels, said channels being defined by the combination of said stator grooves with said rotor journal bearing surface; a cylindrical thrust plate of essentially rectangular cross section having a planar surface defining a coplanar surface on an abutting impeller shroud providing bearing means therefor, said plate further having a plurality of cross sectional ducts originating as orifices coaxial with said interface channels, said ducts inclined approximately 60 degrees from the horizontal axis terminating as annular orifices defining a circle, a pump impeller comprising a plurality of vanes extending radially and lying between coplanar shrouds having opposite surfaces abutting both said thrust plate and said pump housing providing operational thrust journal means, a pump housing in combination with said thrust plate enveloping said impeller, said pump housing providing operationally associated thrust bearings means for abutting impeller shroud thrust journal means, said pump housing further having a radial discharge orifice; a motor housing comprising a cylindrical shell enveloping said stator member attached thereto, and a perpendicular member having an orifice coaxial with said rotor tube providing suction inlet.

3. In a dynamoelectric mechanism, having a magnetically wound stator surrounding a rotor, the combination of a plurality of cylindrical segments on the inner surface of said stator, said segments separated axially by grooves with dielectric metallic oxide formed on the surfaces of said segments, the rotor being provided with a plurality of cylindrical segments having surfaces with dielectric metallic oxide and separated along said surface by grooves, a pump impeller mounted at the end of said rotor at the end of said rotor and stator, a hollow cylindrical tube on which said impeller is mounted, said tube mounted coaxially with said rotor and stator and a shroud member enclosing said impeller, said shroud member having a discharge opening, and an inlet in said hollow cylindrical tube at the end opposite to the impeller mounting, substantially all of said tube surrounded by said rotor and stator.

References Cited by the Examiner

UNITED STATES PATENTS

| 2,201,699 | 5/1940 | Myers | 310—214 |
| 3,229,131 | 1/1966 | Lipe | 310—90 |

FOREIGN PATENTS

| 1,059,329 | 3/1954 | France. | |

ROBERT M. WALKER, *Primary Examiner.*